(12) United States Patent
Ileogben

(10) Patent No.: US 7,748,135 B1
(45) Date of Patent: Jul. 6, 2010

(54) DIAMETER TEMPLATE

(76) Inventor: Pius O Ileogben, 255 Brady Walk, Lawrenceville, GA (US) 30045

( * ) Notice: Subject to any disclaimer, the term of this patent is extended or adjusted under 35 U.S.C. 154(b) by 40 days.

(21) Appl. No.: 12/080,331

(22) Filed: Apr. 2, 2008

(51) Int. Cl.
G01B 5/08 (2006.01)
G01B 3/00 (2006.01)

(52) U.S. Cl. ........................................ 33/555.1; 33/562

(58) Field of Classification Search ............... 33/555.1, 33/501, 520, 529, 542, 555, 555.2, 555.3, 33/562, 563, 564, 565, 566
See application file for complete search history.

(56) References Cited

U.S. PATENT DOCUMENTS

| | | | |
|---|---|---|---|
| 741,146 A * | 10/1903 | Labofish | 33/562 |
| 878,439 A | 2/1908 | Wagniere | |
| 1,343,227 A | 6/1920 | H. J. Ostdiek | |
| 1,441,440 A * | 1/1923 | Mackness | 33/562 |
| 1,610,193 A * | 12/1926 | Battle | 33/529 |
| 1,808,705 A | 6/1931 | Owen, Jr. | |
| 2,166,650 A * | 7/1939 | Townsend | 33/520 |
| 3,924,336 A | 12/1975 | Inoue | |
| 4,188,727 A | 2/1980 | Matui | |
| 5,210,955 A | 5/1993 | Lewis | |
| 5,251,382 A | 10/1993 | Hellar | |
| D346,979 S * | 5/1994 | Stalcup et al. | D10/64 |
| 5,490,335 A | 2/1996 | Chu | |
| 6,434,844 B1 | 8/2002 | Rank | |
| 6,467,179 B1 | 10/2002 | Wolf | |
| 6,594,915 B2 | 7/2003 | Matsumiya et al. | |
| 6,964,110 B2 | 11/2005 | Shapiro | |
| 6,990,746 B2 | 1/2006 | Penna et al. | |
| 7,162,808 B2 * | 1/2007 | Martin | 33/520 |

* cited by examiner

*Primary Examiner*—R. A. Smith

(57) ABSTRACT

A measuring template for measuring both outside and inside diameters. The template includes a plate inscribed with a plurality of arcs with a common centerline and tangent. It also includes two pins attached perpendicularly to the plate such that their centerline intersects the centerline of the arcs at right angle.

5 Claims, 4 Drawing Sheets

DIAMETER TEMPLATE

FEDERALLY SPONSORED RESEARCH

Not Applicable

SEQUENCE LISTING OR PROGRAM

Not Applicable

BACKGROUND

1. Field of the Invention

The present invention relates to measuring device and more particularly pertains to a measuring template for measuring outside and inside diameters, especially of objects with predetermined diameters like pulleys, cylinders and the like.

2. Prior Art

Prior to the present invention there have been numerous devices in a variety of configuration that fulfill the objective of measuring inside and outside diameters accurately. There are all forms of calipers, micrometers, rulers, tapes, straight edge scales and gauges made for this purpose. One characteristic of these prior art devices that is substantially different from this present invention is that the prior art devices have to straddle the entire diameter of the object that they measure. The prior art devices are used for specific measuring application and therefore have limited applications. For example, when a pulley is installed on machinery the diameter would be difficult to measure with accuracy using traditional devices like rulers, straight edge scales and tapes. Tapes, rulers and straight edge instrument are not accurate in measuring the diameter of an object if the diameter points are not shown. In addition, protrusion of a shaft through the center of the pulley on which the pulley is installed would obstruct traversing the pulley diameter for measurement.

Using calipers and micrometer would give accurate result but have limitations. The two fingers of the calipers would have to be longer than the radius of the pulleys to perform the measurement. To hold a caliper over the pulley to measure the diameter, there would have to be enough caliper depth to fit over the shaft and in addition the diameter would have to be marked on the pulley. The use of micrometer in this application would also be limited like the calipers. In addition the micrometer would require so much space for operation than is available within the confinement of a pulley compartment. Another disadvantage of these measuring devices is their physical size and cost as the size of the object to be measured becomes large.

SUMMARY OF THE INVENTION

In view of the prior art devices, the present invention provides new and practical template for use in measuring the outside and inside diameters of an object. The new invention is portable, substantially smaller than the diameter of the object to be measured and simple to use. It does not require straddling the diameter of the object that is measured. It does not require assess to the whole object to read the diameter. All it requires is a segment of the circumference of the object to take measurement. It is compact, precise and fast to use in reading objects with predetermined diameter.

DRAWING

Figure 1:
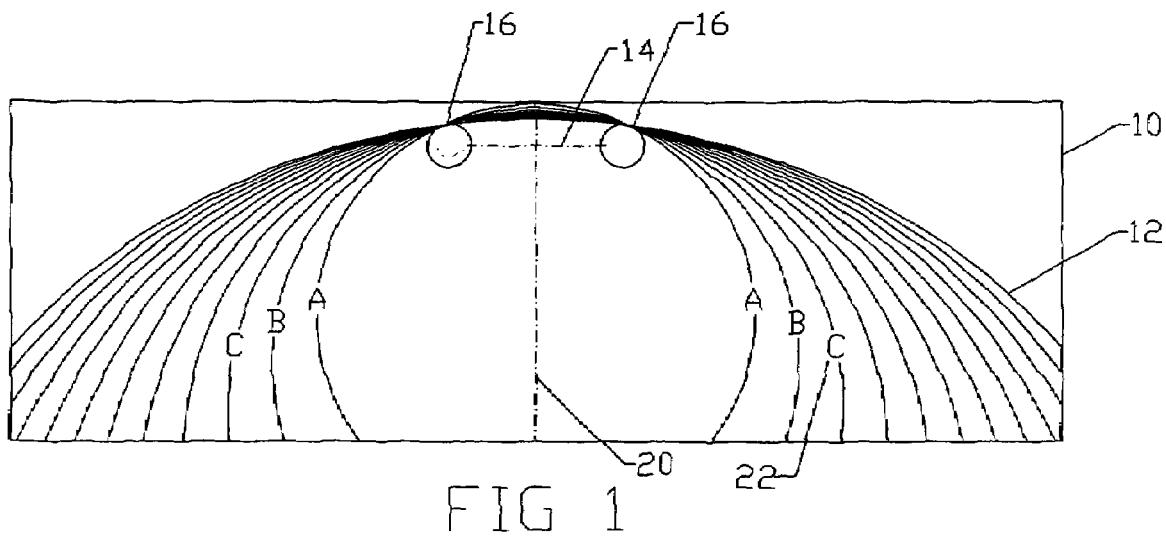

FIG. 1 Front view of the invention for inside diameter measurement

Figure 2:
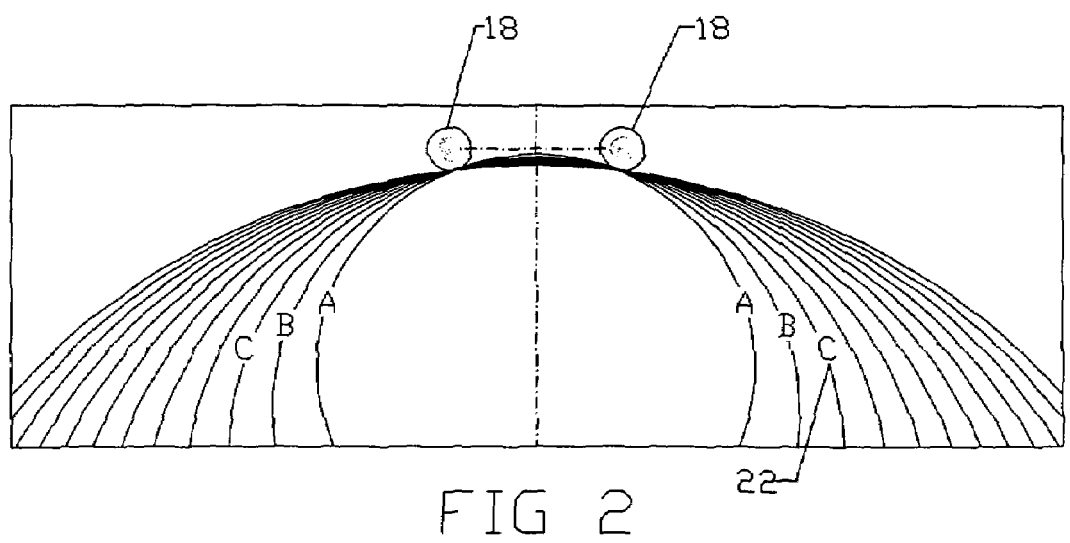

FIG. 2 Front view of the invention for outside diameter measurement

Figure 3:
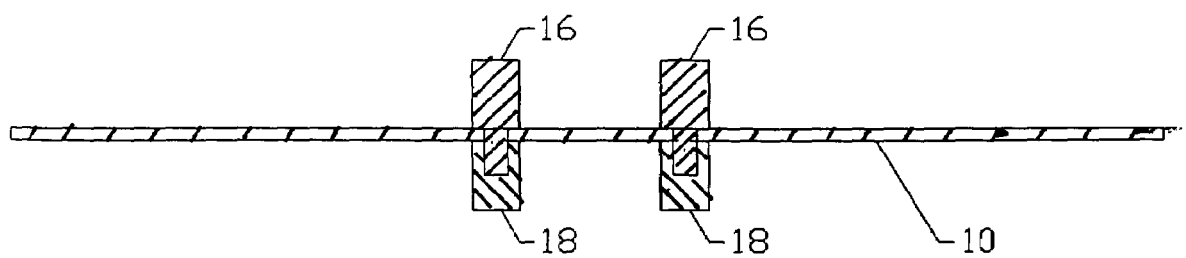

FIG. 3 Section of the invention from top

Figure 4:
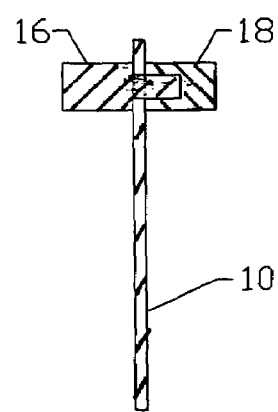

FIG. 4 Section of the invention looking from left side

Figure 5:
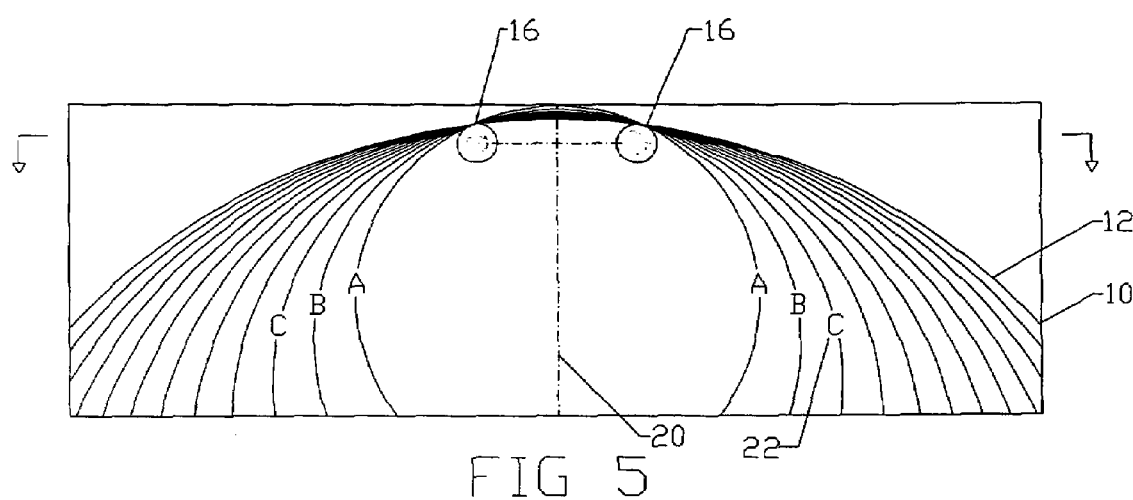

FIG. 5 Front view of the alternate embodiment for inside diameter measurement

Figure 6:
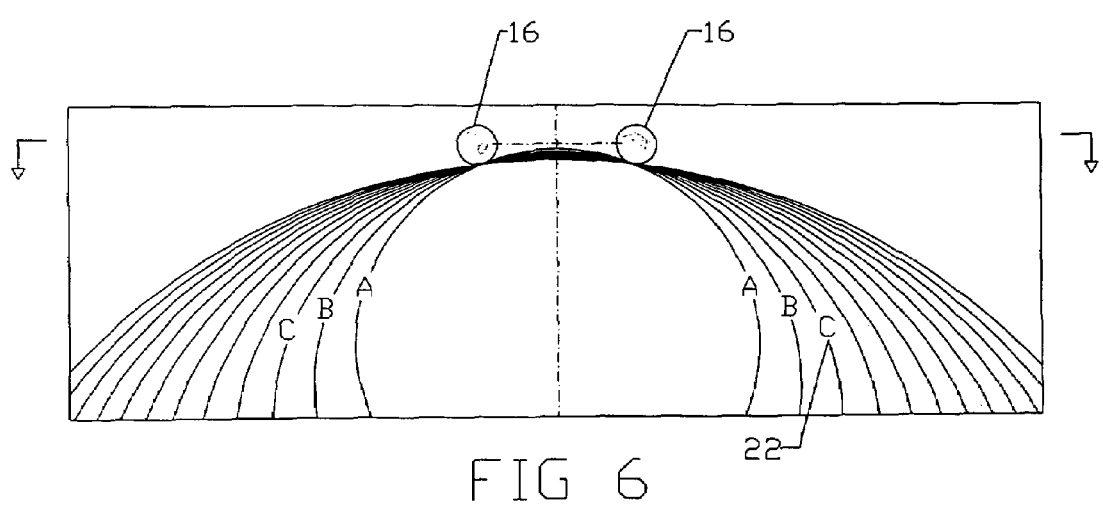

FIG. 6 Front view of the alternate embodiment for outside diameter measurement

Figure 7:
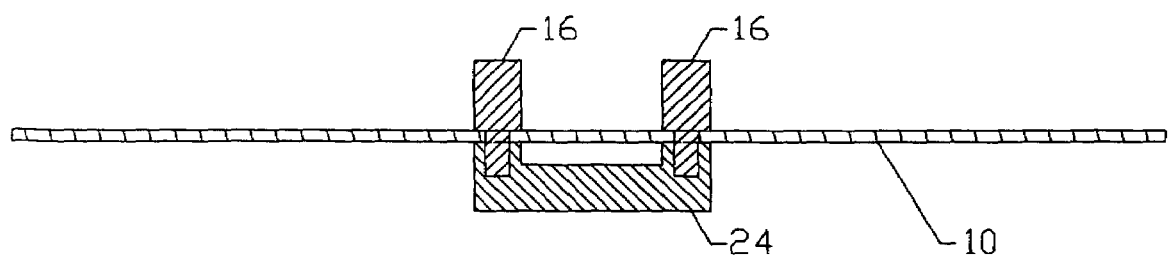

FIG. 7 Section of the alternate embodiment from top

Figure 8:
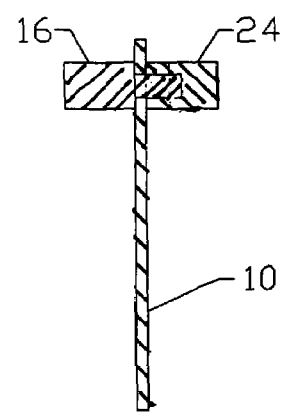

FIG. 8 Section of the alternate embodiment from right side

DETAILED DESCRIPTION

FIG. 1 is a perspective view taken from the front of the product constructed in accordance with the invention. The main body is a plate 10 containing a plurality of arcs 12 with predetermined diameters on each side. Each arc is labeled with its actual numerical diameter 22. The arcs on each side of the plate have a common centerline 20 and are tangent to the pins on that side of the plate. Two pins 16 are attached from one side of plate 10 to two pins 18 on the other side of the plate to form a pair of pins. The pins have equal diameter and the pair of pins are installed parallel to each other and perpendicular to the plate. A centerline 14 between the two pair of pins would intersect the centerline 20 of the arcs at right angle. Both pairs of pins are equidistant from the centerline 20 of the arcs. The pins can be made of magnetic material for hand free operation when measuring objects made of ferrous composition.

On the alternate embodiment, the outside and inside measuring template are made on separate transparent plate 10. The two pins 16 are attached from one side of plate 10 to a handle 22 on the other side of the plate. The handle is provided to hold the template against the object being measured and to provide additional rigidity to the plate as a means of preventing the plate's critical structure from deformation.

REFERENCE NUMERALS

10. Plate
12. Arcs
14. Pins Centerline
16. Male Pins
18. Female Pins
20. Arcs Centerline
22. Diameter of the arc
24. Handle

OPERATION

To measure outside diameter, hold the template against the surface of the object to be measured with the pins resting on the rim or circumference. When measuring objects with ferrous composition, the template will automatically adhere and align itself to fit the object due to magnetic property of the pins. Otherwise, hold the template flat against the surface making sure that both pins are resting on the rim. By design an arc on the template will be superimposed on that segment of the circumference of the object. The number on the arc of the template that is superimposed on the segment of the circumference of the object is the diameter of the object.

To measure inside diameter, hold the template against the surface of the object to be measured with the pins resting in the circumference. When measuring objects with ferrous composition, the template will automatically adhere and align itself to fit the object due to magnetic property of the pins. Otherwise, hold the template flat against the surface of the object making sure that both pins are resting inside of the circumference being measured. By design an arc on the template will be superimposed on that segment of the circumference of the object. The number on the arc of the template that is superimposed on the segment of the circumference of the object is the diameter of the object.

The invention claimed is:

1. A measuring template comprising:
a plate with a plurality of predetermined arcs,
two pins perpendicularly attached to a first side of said plate,
said arcs have a common centerline and are tangent to said pins,
a centerline between the pins that intersects the centerline of the arcs at a right angle, whereby as said plate is held against the surface of the object to be measured with the pins resting on a rim of the object, the circumference of the object can be determined from the plurality of arcs.

2. The measuring template of claim 1 wherein the plate has an opposing second side with an additional two pins perpendicularly attached, and whereby the additional two pins are sized and positioned so that the additional two pins can be rested on said rim of the object and the circumference of the object can be determined from the plurality of arcs.

3. The measuring template of claim 2 wherein each of the two additional pins are coaxially aligned with a respective said pin of the first side and wherein each of the additional pins are secured to the respective said pin of the first side.

4. The measuring template of claim 1 wherein the plate has an opposing second side with a handle perpendicularly attached, and whereby the handle is sized and positioned so that the handle can be rested on said rim of the object and the circumference of the object can be determined from the plurality of arcs.

5. The measuring template of claim 4 wherein the size and position of the handle corresponds to the pins of the first side and wherein the handle is secured to the pins of the first side.

* * * * *